US010143130B2

(12) United States Patent
Hannaford et al.

(10) Patent No.: US 10,143,130 B2
(45) Date of Patent: *Dec. 4, 2018

(54) METHOD AND APPARATUS FOR FERTIGATION WITH WASTEWATER

(71) Applicant: Netafim Ltd., Tel Aviv (IL)

(72) Inventors: Dennis Hannaford, Coarsegold, CA (US); Todd Rinkenberger, Atascadero, CA (US)

(73) Assignee: Netafim Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,618

(22) Filed: Aug. 23, 2016

(65) Prior Publication Data
US 2017/0055440 A1    Mar. 2, 2017

Related U.S. Application Data

(63) Continuation-in-part of application No. 14/834,783, filed on Aug. 25, 2015.

(51) Int. Cl.
| | |
|---|---|
| *A01C 23/00* | (2006.01) |
| *A01G 25/00* | (2006.01) |
| *B01F 15/00* | (2006.01) |
| *B01F 15/02* | (2006.01) |
| *A01C 23/04* | (2006.01) |

(52) U.S. Cl.
CPC .......... *A01C 23/007* (2013.01); *A01C 23/042* (2013.01); *B01F 15/00227* (2013.01); *B01F 15/00422* (2013.01); *B01F 15/026* (2013.01); *B01F 2215/0052* (2013.01)

(58) Field of Classification Search
CPC ...... A01C 23/007; A01C 23/042; A01G 25/02
See application file for complete search history.

(56) References Cited

U.S. PATENT DOCUMENTS

| | | | | |
|---|---|---|---|---|
| 4,210,287 | A | * | 7/1980 | Mehoudar ............ A01G 25/023 239/109 |
| 4,342,650 | A | * | 8/1982 | Erickson ............... C02F 1/5272 210/606 |
| 5,192,426 | A | * | 3/1993 | DeCoster ................. E03B 1/04 210/117 |

(Continued)

FOREIGN PATENT DOCUMENTS

| | | | |
|---|---|---|---|
| EP | 0325046 A1 | * 7/1989 | .............. B01J 47/15 |
| EP | 0325046 A1 | 3/1992 | |
| JP | 3367294 B2 | 1/2003 | |

OTHER PUBLICATIONS

International Search Report for PCT/IB2016/001315, 4 pages. (dated Mar. 2, 2017).

*Primary Examiner* — Benjamin F Fiorello
(74) *Attorney, Agent, or Firm* — Proskauer Rose LLP; James H. Shalek; Andrej Barbic

(57) ABSTRACT

Disclosed are methods and apparatus for blending wastewater with fresh water for fertigation of a crop. In one embodiment, the wastewater and the fresh water are blended at a predetermined flow ratio through a blending valve to obtain a blended stream. A logic based controller controls the blending valve to set a predetermined flow ratio according to the electricity conductivity (EC) of the blended water stream. The blending, measuring, and adjusting steps form a feedback loop so as to maintain the blended stream at a target EC value.

54 Claims, 5 Drawing Sheets

(56) References Cited

U.S. PATENT DOCUMENTS

| | | | |
|---|---|---|---|
| 5,759,286 A | 6/1998 | Sarver | |
| 6,206,612 B1 | 3/2001 | Meyer | |
| 6,224,778 B1 | 5/2001 | Peltzer | |
| 7,404,899 B2* | 7/2008 | Rosen | A01G 25/00 |
| | | | 210/652 |
| 7,410,108 B2* | 8/2008 | Rabinowitz | A01G 25/023 |
| | | | 239/542 |
| 8,511,585 B2* | 8/2013 | Keren | A01G 25/023 |
| | | | 239/533.1 |
| 8,567,121 B2* | 10/2013 | Lazarus | G06Q 30/0202 |
| | | | 47/58.1 SC |
| 8,672,240 B2* | 3/2014 | Masarwa | A01G 25/02 |
| | | | 138/124 |
| 8,893,987 B2 | 11/2014 | Lerner | |
| 2005/0011820 A1* | 1/2005 | Webb | C02F 1/008 |
| | | | 210/192 |
| 2009/0151798 A1 | 6/2009 | Harned | |
| 2012/0123817 A1* | 5/2012 | Hohenberger | G06Q 10/0631 |
| | | | 705/7.12 |
| 2014/0298717 A1* | 10/2014 | Ayers | C12N 1/12 |
| | | | 47/1.4 |
| 2015/0144069 A1* | 5/2015 | Dickerson | C05F 7/00 |
| | | | 119/230 |

* cited by examiner

METHOD AND APPARATUS FOR FERTIGATION WITH WASTEWATER

FIELD OF INVENTION

This invention relates to methods and apparatus for fertigation with wastewater, and more specifically to methods and apparatus for controlled blending of nutrient-rich wastewater with fresh water for purposes of fertigation in connection with agricultural crops through a drip irrigation system.

BACKGROUND

Mountain snow packs and surface water are two main sources for agricultural water needs. Despite the possibility that farmland for crops like cotton, cantaloupes, broccoli, and garlic may be fallow in drought years, empty fields are not an option for crops like silage corn, which are main herd nutrition for dairies.

General strategies for coping with limited water include deficit irrigation of crops, improved irrigation efficiency and/or uniformity, improved crop genetics to develop varieties more tolerant to water stress, and change of crop species. For example, some dairy producers may forego planting silage corn, but instead choose to produce sorghum, which requires only two to three irrigations compared to corn's five to eight. The downside, however, is that use of sorghum could lead to reduced milk production.

An alternative strategy is the utilization of drip irrigation technology to produce dairy crops. For example, a few innovative dairy producers like DeJager farms have successfully produced silage corn with a drip irrigation system using synthetic fertilizers. A major constraint which deters the dairy industry's rapid transition to drip irrigation systems is that the use of synthetic fertilizers displaces dairy manure, the main source of nutrients for forage.

In addition to being a nutrient resource, dairy manure presents an important environmental challenge. Of particular concern is nitrogen pollution resulting from dairy manure applied via flood irrigation—one of the major sources of groundwater contamination in California. The problem is particularly acute in the San Joaquin Valley where the vast majority of the state's dairies reside, and where the long-term application of cow manure to crops has resulted in extensive groundwater degradation. San Joaquin Valley dairies are currently regulated under a general order issued in 2007 by the Central Valley Regional Water Quality Control Board which requires nutrients to be applied at agronomic rates. This presents a difficult challenge since existing flood irrigation methods were practiced over roughly 450,000.00 acres in 2015.

It is therefore desirable to have a technology that would enable the utilization of nutrients like liquid manure in drip irrigation systems with increased water use efficiency to address drought, and at the same time mitigate environmental challenges presented in managing the application of nutrients to fields. It is particularly desirable to have a technology that is able to maintain appropriate levels of nutrients obtained from wastewater blended with a second source of water on a continuous basis, automatically, without manual control or intervention.

BRIEF SUMMARY OF THE INVENTION

The present invention is directed to a method for blending wastewater with fresh water for fertigation of a crop. In one embodiment, the method comprises the steps of (a) providing a source of wastewater, said wastewater containing nitrogen; (b) providing a source of fresh water; (c) blending the wastewater with the fresh water at a predetermined flow ratio through a blending valve to obtain a blended water stream, wherein a logic based irrigation controller controls the blending valve to set the predetermined flow ratio; (d) measuring the electricity conductivity (EC) of the blended water stream with an EC sensor to obtain a measured EC value; (e) adjusting the predetermined flow ratio by the logic based irrigation controller according to the measured EC value; and (f) repeating steps c, d and e, as needed, until the measured EC value in the blended water stream reaches a target EC value.

In another embodiment, the method comprises the steps of (a) providing a source of wastewater, said wastewater containing nitrogen; (b) providing a source of fresh water, said source of fresh water having an unrestricted or uncontrolled flow rate; (c) blending the wastewater with the fresh water, wherein a logic based irrigation controller controls a wastewater control valve to adjust the wastewater flow rate; (d) measuring the electricity conductivity (EC) of the blended water stream with an EC sensor to obtain a measured EC value; (e) adjusting the wastewater flow rate by the logic based controller according to the measured EC value; and (f) repeating steps c, d and e, as needed, until the measured EC value in the blended water stream reaches a target EC value.

In a further embodiment, the method comprises (a) providing a source of wastewater, said wastewater containing nitrogen and said source of wastewater independently controlled by a first variable speed pump; (b) providing a source of fresh water, said source of fresh water independently controlled by a second variable speed pump; (c) blending the wastewater with the fresh water to obtain a blended water stream, wherein a logic based irrigation controller controls a variable frequency drive (VFD) motor control for the first and second variable speed pumps; (d) measuring the electricity conductivity (EC) of the blended water stream with an EC sensor to obtain a measured EC value; (e) adjusting the wastewater and fresh water flow rates by the logic based controller according to the measured EC value; and (f) repeating steps c, d and e, as needed, until the measured EC value in the blended water stream reaches a target EC value.

In further embodiments, the methods may comprise a step of feeding the blended water stream in step (f) through an irrigation system. That irrigation system may be a drip irrigation system, and in one preferred embodiment, the drip irrigation system may be a sub-surface irrigation system. In certain embodiments, particularly where there is the prospect of clogging the system, the blended water stream is filtered before being fed though an irrigation system. A back-flush filter may be used to the system to allow the filter to be cleared periodically.

The source of wastewater may be a farm storage lagoon. In other embodiments, the source of fresh water is a well, surface stream, or fresh water reservoir. The blended water may be used, for example, for fertigation in a silage corn crop or a winter forage crop or other crops. In some embodiments, the blending valve is a hydraulic blending valve or an electronically operated blending valve or a pneumatically operated valve. In some embodiments, three or more sources of water may be blended through the blending valve.

Additional blending methods involve, for example, unrestricted or uncontrolled fresh water inlet flow and controlled wastewater flow. In one embodiment, one or more valves, which may be, but are not limited to, mechanical, pneumatic, or hydraulic valves, control the wastewater flow rate by opening or closing. Opening and closing of the valves of the present invention occur in response to EC measurements taken from an EC sensor that are implemented by one or more logic based controllers.

Further blending methods involve, for example, independently controlled fresh water and wastewater pumps, including, for example, variable speed pumps, that can change the flow rate of fresh water and wastewater, respectively, through one or more logic based controllers.

In some embodiments, the steps in the method are automated in a continuous manner to maintain the measured EC value in the blended water stream at a target EC value. In one embodiment, the target EC value may be calculated according to the projected weekly nitrogen uptake and crop evapotranspiration (ETc) of a crop field. The calculation in a particular instance may be based on the formula EC=0.0146÷0.227×uptake (lb Nitrogen/acre)÷ETc (inches)+0.3255.

Another aspect of the present invention is an apparatus for blending wastewater with fresh water for fertigation of a crop. In a preferred embodiment, the apparatus comprises either (1) a blending valve for blending two or more sources of water into a blended water stream at a predetermined flow ratio, wherein the two or more sources of water comprises at least one source of wastewater that contains nitrogen and at least one source of fresh water, (2) a wastewater control valve for adjusting the wastewater flow rate into a blended water stream, or (3) a VFD motor control for independently controlling a first variable speed pump connected to a wastewater source and a second variable speed pump connected to a fresh water source; an EC sensor for measuring the electricity conductivity (EC) of the blended water stream; and a logic based controller for controlling the blending valve/wastewater control valve/VFD motor control to set the predetermined flow ratio/wastewater flow rate/ fresh water flow rate according to the measured EC in the blended water stream. In some embodiments, the blending valve is a hydraulic blending valve or an electronically operated blending valve or pneumatic operated valve and in some, the logic based controller comprises a motor actuator that actuates the flow ratio of the two or more sources of water.

BRIEF DESCRIPTION OF THE DRAWINGS

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which.

Figure 1:
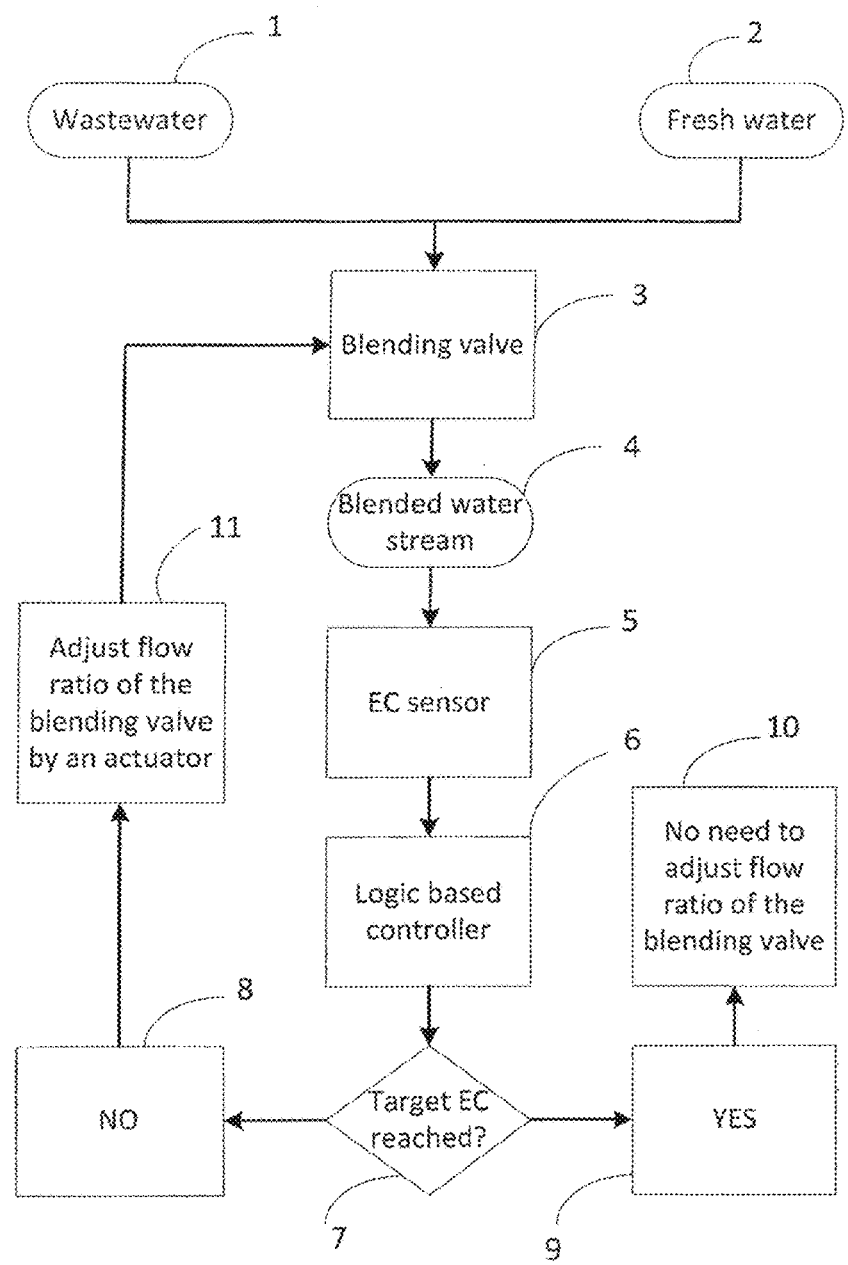
FIG. 1 shows a flow chart depicting the steps for blending wastewater with fresh water in a controlled manner.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION OF THE INVENTION

The inventors have designed methods for blending wastewater with fresh water to apply nutrients to crops in a controlled manner, and several apparatus for practicing the method. The inventions are in part based on the establishment of a proxy relationship between electricity conductivity (EC) value and nitrogen content in water.

Methods

A principal aspect of the invention is a method for blending wastewater with fresh water to make a blended stream for use in targeting crops with an application of nutrients. As shown in FIG. 1, the method is an automated method in which the steps in the method are performed in a continuous manner. This may include the steps of providing a source of wastewater 1, said wastewater containing nitrogen; providing a source of fresh water 2; blending the wastewater with the fresh water at a predetermined flow ratio through a blending valve 3 to obtain a blended water stream 4, wherein a logic based controller 6 controls the blending valve to set the predetermined flow ratio; measuring the electricity conductivity (EC) of the blended water stream with an EC sensor 5 to obtain a measured EC value; adjusting the predetermined flow ratio by the logic based controller according to the measured EC value 11; and repeating the above blending, measuring, and adjusting steps until the measured EC value in the blended water stream reaches a target EC value. The logic based controller 6 receives a signal from the EC sensor 5 and determines whether a target EC has been reached in the blended water stream. When a target EC has been reached 9, the logic based controller will not adjust the flow ratio in the blending valve 10. When a target EC has not been reached 8, the logic based controller will automatically adjust the flow ratio in the blending valve by an actuator 11.

In contrast to the semi-automated method embodiments described below, the automated method embodiments may be applied even when the nutrient concentrations in the wastewater 1 may vary with time. Additionally, in the automated method embodiments, the adjustment of the predetermined flow ratio 11 does not rely on the skill of the operator who would have to set the predetermined flow ratio manually. Further, in the automated method embodiments, there is no cost of lab analyses or any time delay in obtaining lab results. In the automated method embodiments of the invention, the adjustments of flow ratios take place in real time and provide improved precision.

In another embodiment, the method is a semi-automated method in which some of the aforementioned steps in the method, or additional steps, are performed manually. For example, samples of the nutrient rich wastewater could be taken manually every other week and delivered to a lab for analysis. Once lab results are received, manual calculations can be completed to determine the appropriate amounts of fresh and wastewater to blend to obtain the targeted rates of nutrients to be applied to the crop. As another example, the incoming flow ratios from the wastewater and the natural sources could be adjusted using manual valves and visual readings of flowmeters on both the fresh and wastewater sources. Once these values and valves were set, the system would operate in a static position until the next testing of the nutrient rich wastewater is performed, ordinarily in 1-2 weeks. Semi-automated methods may be applied when there are no constant changes in the nutrient levels of the wastewater, no significant changes in pressure conditions of the water sources, and/or the operator is well-trained to adjust the flow ratios.

In some embodiments, the blended stream that has attained the targeted EC level will be fed through an irrigation system immediately for fertigation on a crop. In other instances, a blended water stream that has attained the targeted EC level is not immediately fed into an irrigation system but instead is filtered to exclude particles that would prevent an irrigation system from functioning properly. The filtration may be carried out using a commercially available filter known in the art.

Figure 4:
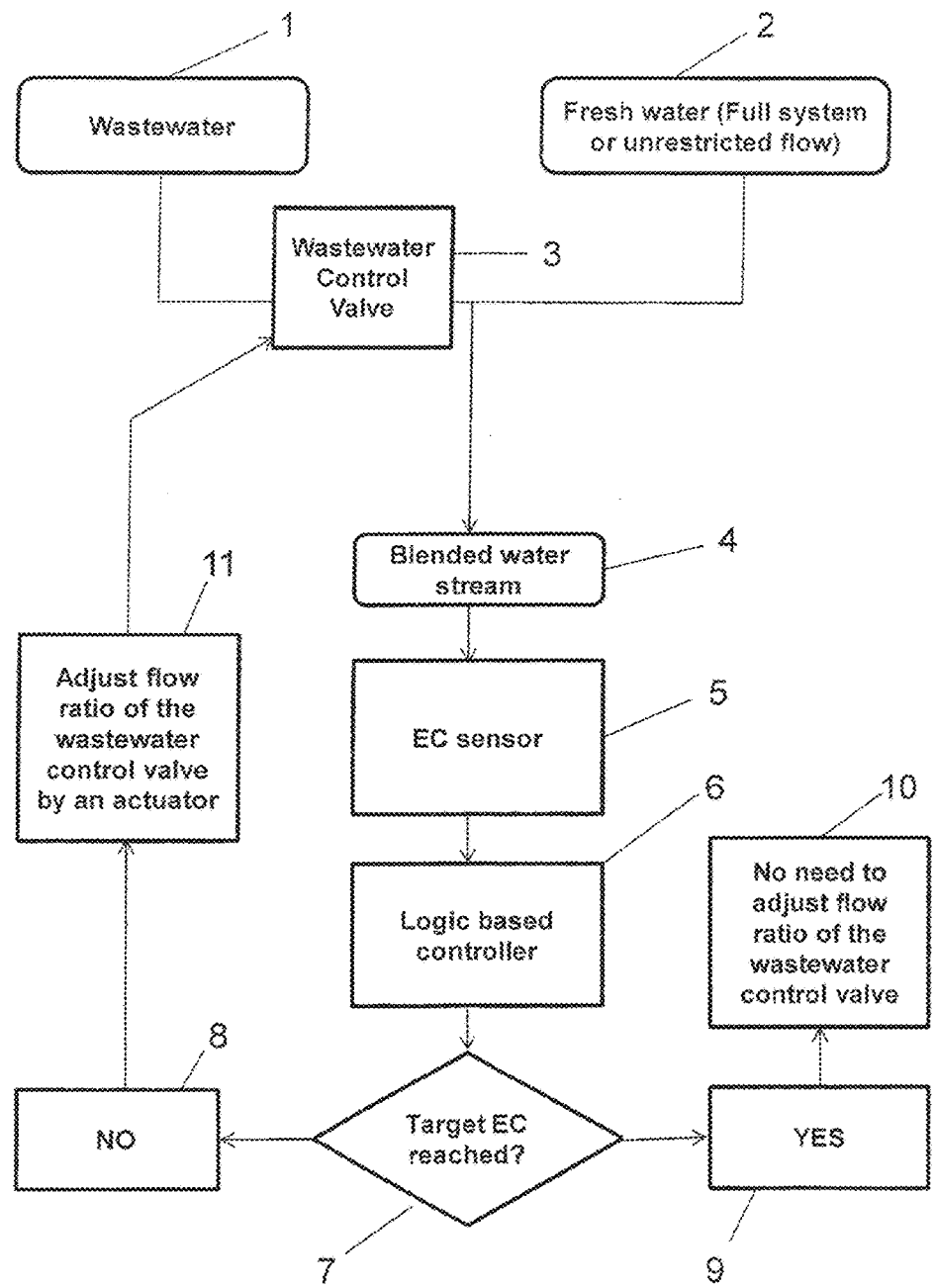
FIG. 4 shows a flow chart depicting the steps for blending wastewater with fresh water wherein the fresh water inlet flow is unrestricted or uncontrolled and the wastewater flow rate is controlled by one or more wastewater control valves.

Another aspect of the invention is a method for blending wastewater with fresh water to make a blended stream for use in targeting crops with an application of nutrients. As shown in FIG. 4, the method is an automated method in which the steps in the method are performed in a continuous manner. This may include the steps of providing a source of wastewater 1, said wastewater containing nitrogen, and wherein said wastewater passes through a wastewater control valve 3; providing a source of fresh water 2, wherein the source of fresh water is a full system or unrestricted flow of fresh water; blending the wastewater and fresh water to obtain a blended water stream 4, wherein a logic based controller 6 controls the wastewater control valve to set the wastewater flow rate; measuring the EC of the blended water stream with an EC sensor 5 to obtain a measured EC value; adjusting the wastewater flow rate by the logic based controller according to the measured EC value 11; and repeating the above blending, measuring, and adjusting steps until the measured EC value in the blended water stream reaches a target EC value. The logic based controller 6 receives a signal from the EC sensor 5 and determines whether a target EC has been reached in the blended water stream. When a target EC has been reached 9, the logic based controller will not adjust the flow in the wastewater control valve 10. When a target EC has not been reached 8, the logic based controller will automatically adjust the flow ratio in the wastewater control valve by an actuator 11.

Figure 5:
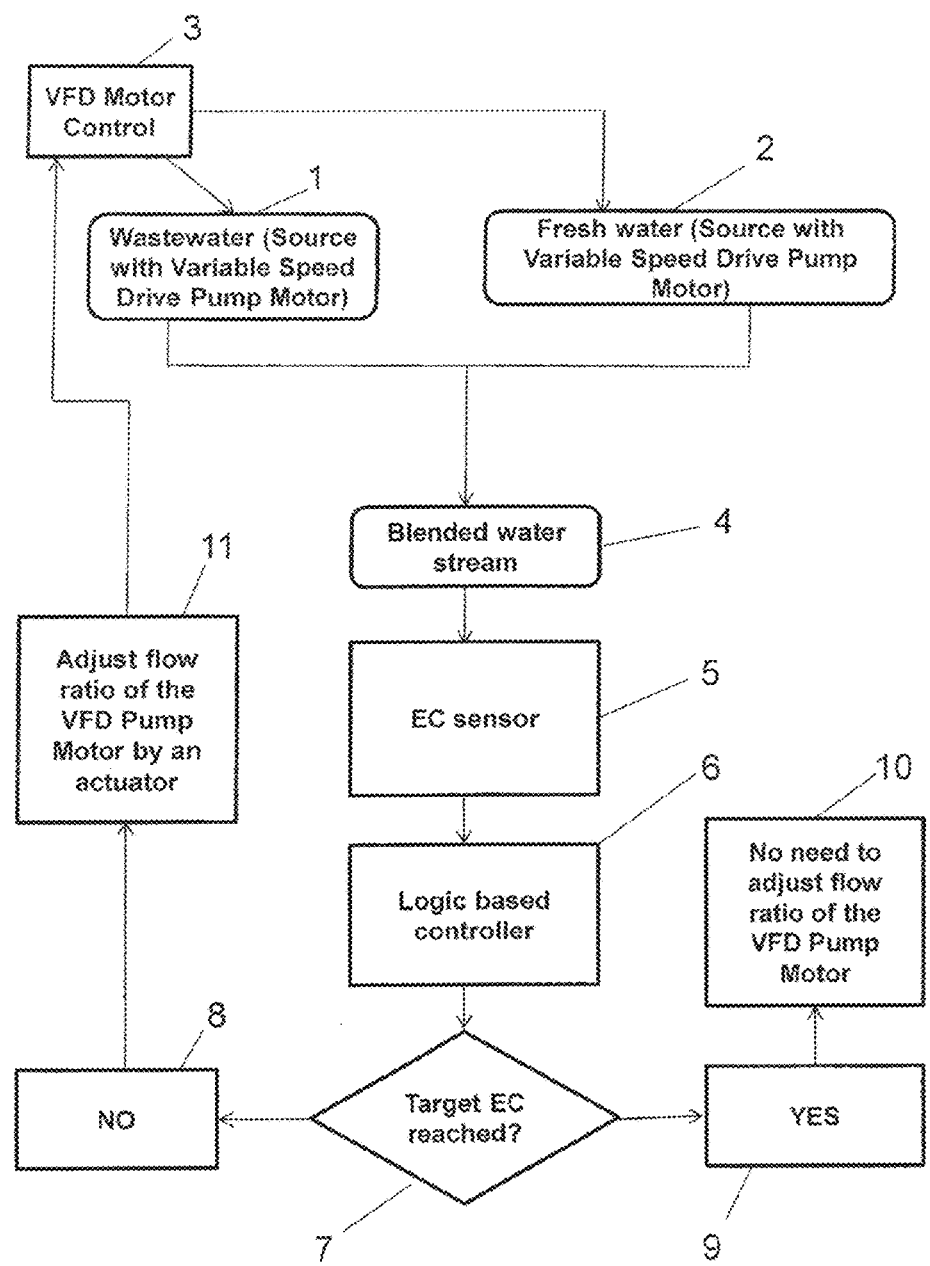
FIG. 5 shows a flow chart depicting the steps for blending wastewater with fresh water wherein the fresh water and wastewater flow rates are controlled independently by pumps that can change the flow rate of both fresh water and wastewater based on one or more logic-based controllers.

Another aspect of the invention is a method for blending wastewater with fresh water to make a blended stream for use in targeting crops with an application of nutrients. As shown in FIG. 5, the method is an automated method in which the steps in the method are performed in a continuous manner. This may include the steps of providing a source of wastewater 1, said wastewater containing nitrogen and originating from a source equipped with a variable speed drive pump motor; providing a source of fresh water 2 that originates from a source equipped with a variable speed drive pump motor; blending the wastewater and fresh water to obtain a blended water stream 4, wherein a logic based controller 6 controls the VFD motor control 3 to set the wastewater and fresh water flow rates; measuring the EC of the blended water stream with an EC sensor 5 to obtain a measured EC value; adjusting the wastewater flow rate and/or the fresh water flow rate by the logic based controller according to the measured EC value 11; and repeating the above blending, measuring, and adjusting steps until the measured EC value in the blended water stream reaches a target EC value. The logic based controller 6 receives a signal from the EC sensor 5 and determines whether a target EC has been reached in the blended water stream. When a target EC has been reached 9, the logic based controller will not adjust the flow via the VFD Pump Motor 10. When a target EC has not been reached 8, the logic based controller will automatically adjust the flow ratio in the VFD pump motor by an actuator 11.

Examples of an irrigation system include a pipe network coupled with drip emitters, emitting tape or sprinklers. The pipe may be a solid pipe or a flexible pipe. Examples of the pipes are described in U.S. Pat. Nos. 8,893,987 and 8,672,240. Examples of drip emitters are described in U.S. Pat. Nos. 8,511,585 and 7,410,108. In a certain embodiment, the irrigation system is a drip irrigation system such as the system described in U.S. Pat. No. 4,210,287. The method may be used for fertigation for any variety of crops and, preferably dairy crops, e.g., silage corn and winter forage, in particular.

Figure 2:
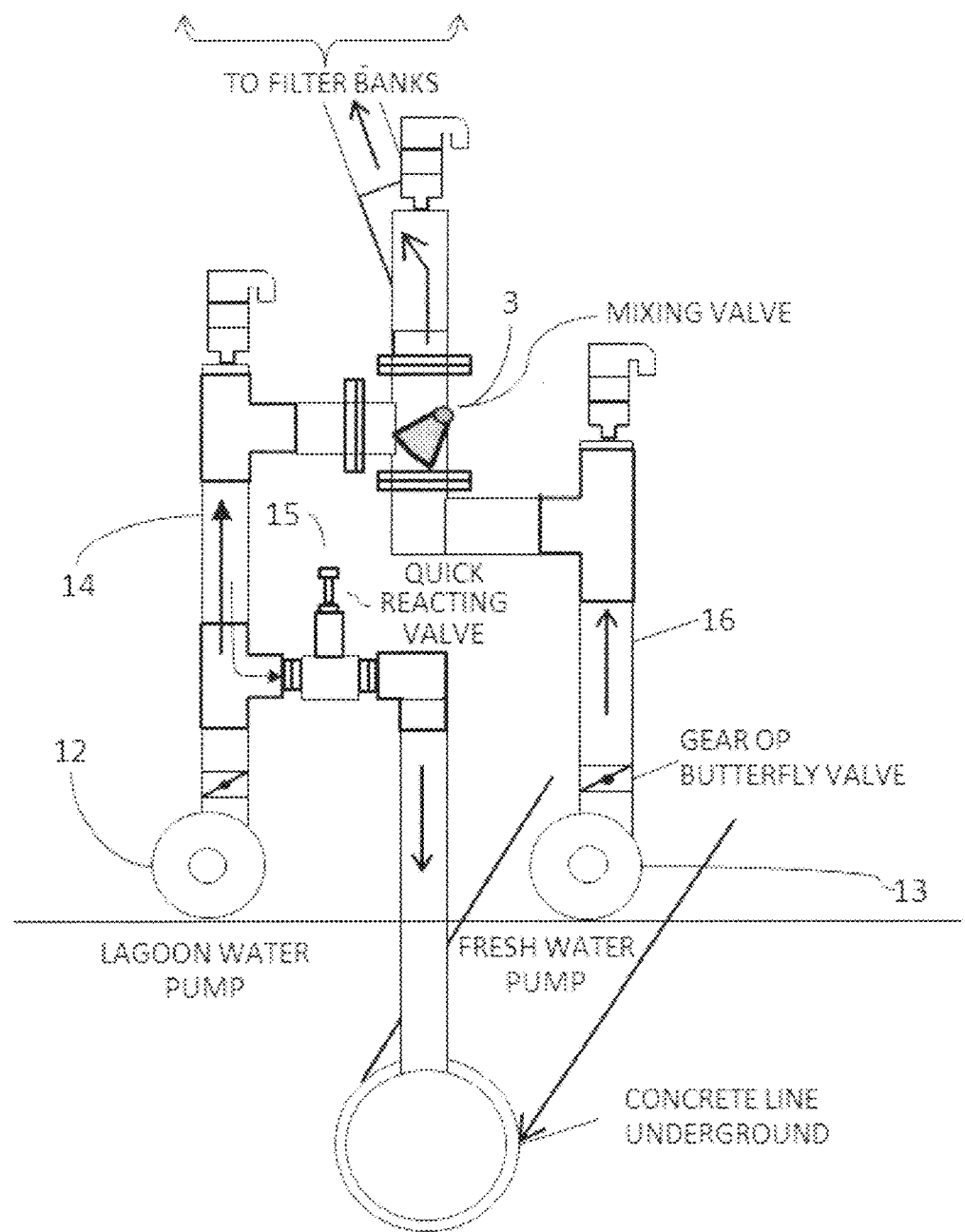
FIG. 2 shows a sketch depicting components of an apparatus for blending wastewater with fresh water in a controlled manner.

In some embodiments, the wastewater may be from any source including the liquid dairy manure from a storage lagoon or similar facilities. In some embodiments, the source of fresh water may be a well, a surface stream, river, slough canal or other surface water source or a fresh water reservoir. Water from the various sources used may be pumped separately into a blending valve. As shown in FIG. 2, the wastewater may be pumped by a wastewater pump 12 into a pipe 14 that is connected to a blending valve 3, and the fresh water may be pumped by a fresh water pump 13 into a pipe 16 that is connected to the same blending valve 3.

The flow ratio of each water source may be adjusted by adjusting the blending valve. For example, to increase nutrient level in the blended water stream, the opening in the blending valve towards the wastewater pipe is expanded. In a certain embodiment, the adjustment is achieved by a motor actuator 11. A motor actuator may adjust the blending valve according to the measured EC value in the blended water stream and the target EC value. In one embodiment, a motor-operated valve that opens and closes the fresh water and/or wastewater feeds to varying degrees in response to feedback from the controller is used.

In some embodiments, the target EC value may be calculated according to the relationship between EC and nitrogen content that has been established. Example 1 provides a detailed example as to the establishment of such a relationship as well as how to calculate the target EC value. The establishment of the relationship between EC value and nitrogen content makes it feasible to automatically control nitrogen concentration in a blended water stream by monitoring the EC value of the blended water stream. Without the herein established proxy relationship between EC value and nitrogen content, one has to periodically take water samples, often manually, from the blended water stream and measure the nitrogen content in the water samples separately in a relatively much more time- and labor-intensive manner. The target EC value is a function of the nitrogen demands of the particular crop being fertilized. Nitrogen demands for given crops are generally known.

In FIG. 1, steps/modules 3 to 11 form a feedback loop, which is run constantly with the objective of maintaining a pre-determined level of nutrients in the blended water to achieve the targeted level of nutrient application to crops. The method enables the utilization of wastewater, e.g., liquid manure, for fertigation in a drip irrigation system, which results in increased water use efficiency to address drought issues. Further, the method also mitigates environmental challenges in managing nutrients applied to the field because the amount of nutrient, e.g., nitrogen, is precisely controlled.

Apparatus

Another aspect of the present invention is an apparatus for practicing the methods of the present invention as set forth in, for example, FIG. 1. In one embodiment, the apparatus comprises a blending valve 3 for blending two or more sources of water into a blended water stream 4 at a predetermined flow ratio, wherein the two or more sources of water comprise at least one source of wastewater 1 that contains nitrogen and at least one source of fresh water 2; an EC sensor 5 for measuring the electricity conductivity (EC) of the blended water stream; and a logic based controller 6 for controlling the blending valve to set the predetermined flow ratio according to the measured EC in the blended water stream 7-11.

Another aspect of the present invention is an apparatus for practicing the methods of the present invention as set forth in, for example, FIG. 4. In one embodiment, the apparatus comprises a wastewater control valve 3 for controlling the flow of wastewater into a blended water stream 4, wherein the two or more sources of water comprises at least one source of wastewater 1 that contains nitrogen and at least one source of fresh water 2, wherein the fresh water is a full system or unrestricted flow of fresh water; an EC sensor 5 for measuring the electricity conductivity (EC) of the blended water stream; and a logic based controller 6 for controlling the wastewater control valve to adjust the wastewater flow according to the measured EC in the blended water stream 7-11.

Another aspect of the present invention is an apparatus for practicing the methods of the present invention as set forth in, for example, FIG. 5. In one embodiment, the apparatus comprises a VFD Motor Control 3 for independently controlling the flow of wastewater and fresh water, both via variable speed drive pump motors, into a blended water stream 4, wherein the two or more sources of water comprise at least one source of wastewater 1 that contains nitrogen and at least one source of fresh water 2; an EC sensor 5 for measuring the electricity conductivity (EC) of the blended water stream; and a logic based controller 6 for controlling the VFD Motor Control to adjust the wastewater and fresh water flow according to the measured EC in the blended water stream 7-11.

The blending valve 3 is preferably a hydraulic or electronically-operated blending valve. For example, a Dorot blending valve, which is well-known in the art, may be used. The blending valve may be used for regulating a fixed pre-set flow ratio between two or more lines regardless of fluctuating pressures and changing demands. Alternatively, the flow ratio may be set by the user or allowed to vary.

Another blending apparatus has a fresh water inlet with an unrestricted or uncontrolled flow and a wastewater inlet with a controlled flow. The apparatus uses one or more valves, for example, mechanical, pneumatic, or hydraulic valves, that open or close depending on the desired flow rate determined by EC and implemented by a logic based controller.

Yet another blending apparatus utilizes variable speed drive pump motors controlled by a VFD motor control to blend fresh water and wastewater from their respective sources. In this apparatus, wastewater and fresh water flow rates are independently controlled based on the logic based controller.

In some embodiments, the EC sensor 5 may be any sensor that detects electricity conductivity known in the art. In some embodiments, the EC sensor 5 is coupled to an EC transmitter. In other embodiments, the EC sensors and EC transmitters may also be pH sensors and pH transmitters.

In some embodiments, the logic based controller 6 may receive signals sent either through a wire or wirelessly from EC sensors. Controller 6 typically processes the signal to determine whether an EC target is reached. In one embodiment, the logic based controller further comprises an actuator that actuates the blending valve when an EC target is not reached.

One exemplary actuator is an ESBE series 90 electronic motor actuator that may rotate rotary valves. The actuator may be adjusted automatically or manually. In a certain embodiment, the actuator may actuate 2 sources of water in the blending valve. In another certain embodiment, the actuator may actuate 3 sources of water in the blending valve. In a further certain embodiment, the actuator may actuate 4 sources of water in the blending valve.

Example 1

In this Example, the inventors first established a relationship between EC and nitrogen concentration in a blend of wastewater and well water. The inventors then utilized the method to make precisely targeted applications of nitrogen through blended water using the Netafim FertiKit™ EC sensor and the Netafim NMC™ logical controller to control the blending valve.

TABLE 1

Chart Showing Sample Analysis Results

| Date | Source | Lab | FW/WW | ECw mmhos/cm | TKN ppm | $NH_4$—N ppm | $NO_3$—N ppm | N ppm |
|---|---|---|---|---|---|---|---|---|
| May. 20, 2010 | DW 16 | Dellavalle | | 0.35 | | | 2.5 | 2.5 |
| Aug 10, 2011 | DW 16 | Dellavalle | | 0.38 | | | 3.8 | 3.8 |
| Jul. 5, 2012 | DW 16 | Dellavalle | | 0.40 | | | 4.5 | 4.5 |
| Jul. 25, 2013 | DW 16 | Dellavalle | | 0.84 | | | 21.4 | 21.4 |
| Jun. 24, 2014 | Lagoon | Denele | | 5.97 | 538 | 409 | | 538 |
| Jun. 24, 2014 | Lagoon | Denele | | 6.81 | 549 | 493 | | 549 |
| Jul. 29, 2014 | Lagoon | Denele | | 6.86 | 386 | 370 | | 386 |
| Jul. 30, 2014 | DW 16 | Dellavalle | | 0.69 | | | 15.7 | 15.7 |
| Aug. 1, 2014 | Blend | Denele | 240/50 | 1.77 | 112 | 64 | | 112 |
| Aug. 5, 2014 | Lagoon | Denele | | 8.85 | 566 | 389 | | 566 |
| Aug. 5, 2014 | WW | Denele | | 8.61 | 560 | 395 | | 560 |
| Aug. 5, 2014 | Blend | Denele | 240/50 | 2.11 | 118 | 64 | | 118 |
| Aug. 12, 2014 | DW 16 | Denele | | 0.70 | | | 16.2 | 16.2 |

TABLE 1-continued

Chart Showing Sample Analysis Results

| Date | Source | Lab | FW/WW | ECw mmhos/cm | TKN ppm | NH$_4$—N ppm | NO$_3$—N ppm | N ppm |
|---|---|---|---|---|---|---|---|---|
| Aug. 12, 2014 | WW | Denele | | 8.35 | 510 | 445 | | 510 |
| Aug. 12, 2014 | Blend | Denele | 240/50 | 2.26 | 118 | 81 | | 118 |
| Aug. 19, 2014 | WW | Denele | | 8.45 | 554 | 468 | | 554 |
| Mar. 25, 2015 | DW16 | Denele | | 0.52 | | | 7.1 | 7.1 |
| Mar. 25, 2015 | WW | Denele | | 13.5 | 812 | 560 | | 812 |
| Mar. 25, 2015 | Blend | Denele | 230/10 | 1.05 | 67 | 59 | | 67 |

Methods: Wastewater, well water and field blends were sampled periodically during the corn, wheat, and other forage crop growing seasons. Wastewater was collected (dipped) from the DeJager North storage lagoon and from the pressurized distribution line upstream of the mixing and filter station at the trial site. Well water was sampled directly from the DW 16 discharge and the field blends—wastewater blended with well water—were sampled downstream of the filters as irrigation was in progress. Flow rates (from the system flowmeters) were noted as blended samples were collected. All of the samples were analyzed for the target ECw (w refers to water), TKN (wastewater, including blends), NO3-N (well water), pH and other macro- and micro-nutrients, at Denele Analytical Lab in Turlock. ECw and NO3-N from DW 16 water analyses going back four years were also added to the data set (Table 1).

Results: The measures of nitrogen in wastewater were Total Kjeldahl Nitrogen (TKN) and ammonium-N(NH4-N). TKN included NH4-N as well as organic N, and while organic N had to be mineralized to be plant-available, it was reasonable to assume that Field 144, with a history of yearly manure applications—liquid and solid—was in a steady state of organic nitrogen mineralization. Thus, it was reasonable here to use TKN as a measure of plant-available nitrogen. TKN has also been used by dairies to provide reports to the Water Board on applied nitrogen in wastewater.

Figure 3:
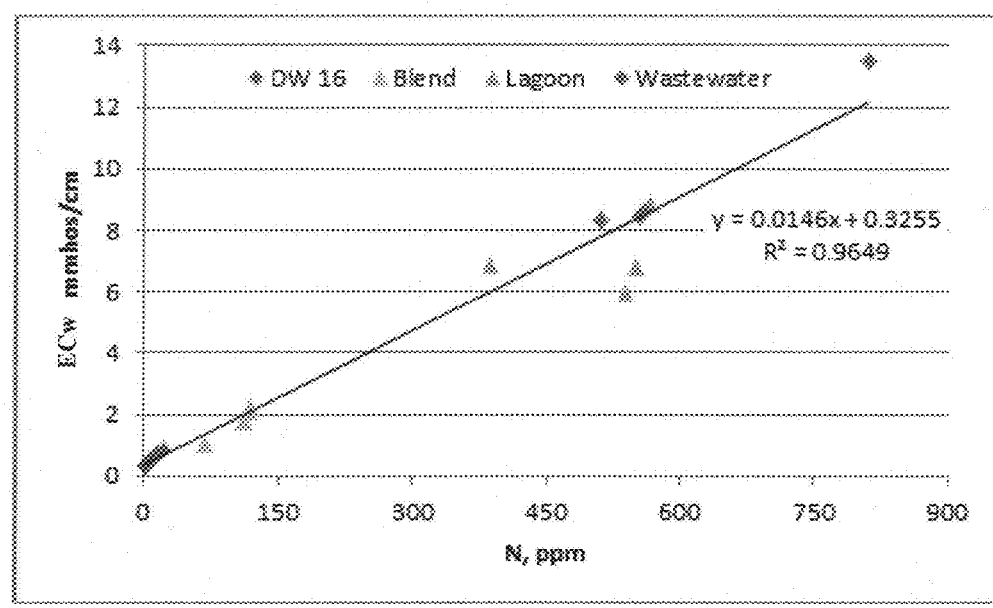
FIG. 3 shows a graph depicting the linear regression of $EC_w$ and nitrogen concentration in water.

By including ECw and nitrogen from all of the water analyses in the data set and performing simple linear regression with N as the independent variable, the inventors obtained the following relationship:

$$ECw = 0.0146 \times ppm\ N + 0.3255$$

$$R^2 = 0.9649 \text{(FIG. 3)}.$$

Converting from ppm N $$ppm\ N \times 0.227 = \frac{lb\ N}{acre * inch}$$

$$ECw = \frac{0.0146}{0.227} = \frac{lb\ N}{acre} \times \frac{1}{inch} + 0.3255.$$

In this general form, an ECw target could be set using the projected weekly N uptake and ETc:

$$ECw = \frac{0.0146}{0.227} \times Uptake \left(\frac{lb\ N}{acre}\right) \div ETc\ (inches) + 0.3255.$$

In one example, three 13-acre treatment blocks in Field 144 were irrigated in 12-hour sets. To apply a target amount of N in a set time, the following calculation was run:

$$ECw = \frac{0.0146}{0.227} \times$$
$$Uptake \left(\frac{lb\ N}{acre}\right) \div \left[Precip.\ rate\left(\frac{inches}{hour}\right) \times Run\ time\ (hours)\right] + 0.3255.$$

The target ECw could then be entered in the NMC program which controlled the blending valves. The resolution of the EC sensor in that instance was 0.1 mmho/cm, or a concentration of 1.6 lb N/acre-inch.

We claim:

1. A method for blending wastewater with fresh water for fertigation of a crop, comprising:
   (a) providing a source of wastewater, the wastewater containing nitrogen;
   (b) providing a source of fresh water, said source of fresh water having an unrestricted or uncontrolled flow rate;
   (c) blending the wastewater with the fresh water with a single blending valve, wherein an irrigation controller controls a wastewater control valve to adjust the wastewater flow rate;
   (d) measuring the electricity conductivity (EC) of the blended water stream with an EC sensor to obtain a measured EC value, wherein the measured EC value is derived at least from the nitrogen content of the blended water stream;
   (e) adjusting the wastewater flow rate by the irrigation controller according to the measured EC value; and
   (f) repeating steps (c), (d), and (e), as needed, until the measured EC value in the blended water stream reaches a target EC value.

2. The method of claim 1, further comprising a step of feeding the blended water stream through an irrigation system following step (f).

3. The method of claim 2, wherein the irrigation system is a drip irrigation system.

4. The method of claim 3, wherein the drip irrigation system is a sub-surface irrigation system.

5. The method of claim 3, wherein the drip irrigation system is a surface irrigation system.

6. The method of claim 2, wherein the blended water stream is filtered before being fed through an irrigation system.

7. The method of claim 1, wherein the source of wastewater is a farm storage lagoon.

8. The method of claim 1, wherein the source of fresh water is a well, a surface stream, river, drainage slough, canal, pipeline or a fresh water reservoir.

9. The method of claim 1, wherein the crop is a silage corn crop.

10. The method of claim 1, wherein the steps c to f are automatically performed in a continuous manner to maintain the measured EC value in the blended water stream at the target EC value.

11. The method of claim 1, wherein the target EC value is calculated according to the projected weekly nitrogen uptake and crop evapotranspiration (ETc).

12. The method of claim 11, wherein the target EC value is calculated based on the formula EC=0.0146÷ 0.227× uptake (lb Nitrogen/acre)÷ETc (inches)+0.3255.

13. The method of claim 1, wherein the nitrogen in the wastewater is derived from manure.

14. The method of claim 1, wherein the target EC value is greater than zero and less than about 2.5 mmhos/cm.

15. The method of claim 14, wherein the target EC value is greater than about 1 mmhos/cm and less than about 2.25 mmhos/cm.

16. The method of claim 1, wherein the nitrogen content of the blended water stream is greater than zero parts per million (ppm) and less than about 150 ppm.

17. The method of claim 16, wherein the nitrogen content of the blended water stream is greater than about 50 ppm and less than about 125 ppm.

18. An apparatus for blending wastewater with fresh water for fertigation of a crop, comprising:
 (a) a single blending valve for blending wastewater with fresh water;
 (b) a wastewater control valve for adjusting the wastewater flow rate into a blended water stream;
 (c) an EC sensor for measuring the electricity conductivity (EC) of the blended water stream, wherein the measured EC value is derived at least from nitrogen content of the blended water stream; and
 (d) an irrigation controller for controlling the wastewater control valve to set the wastewater flow rate according to the EC determined for the blended water stream.

19. The apparatus of claim 18, wherein the wastewater control valve is a hydraulic wastewater control valve.

20. The apparatus of claim 18, wherein the wastewater control valve is an electronically operated wastewater control valve.

21. The apparatus of claim 18, wherein the wastewater control valve is a pneumatic wastewater control valve.

22. The apparatus of claim 18, wherein the irrigation controller comprises a motor actuator that actuates the flow rate of the wastewater and fresh water.

23. The apparatus of claim 18, wherein said EC sensor is able to continuously monitor the EC level and the irrigation controller controls the wastewater control valve to maintain the wastewater flow rate automatically and continuously.

24. The apparatus of claim 18, wherein the nitrogen in the wastewater is derived from manure.

25. The apparatus of claim 18, wherein the target EC value is greater than zero and less than about 2.5 mmhos/cm.

26. The apparatus of claim 25, wherein the target EC value is greater than about 1 mmhos/cm and less than about 2.25 mmhos/cm.

27. The apparatus of claim 18, wherein the nitrogen content of the blended water stream is greater than zero parts per million (ppm) and less than about 150 ppm.

28. The apparatus of claim 27, wherein the nitrogen content of the blended water stream is greater than about 50 ppm and less than about 125 ppm.

29. A method for blending wastewater with fresh water for fertigation of a crop, comprising:
 (a) providing a source of wastewater, said wastewater containing nitrogen and said source of wastewater independently controlled by a first variable speed pump;
 (b) providing a source of fresh water, said source of fresh water independently controlled by a second variable speed pump;
 (c) blending the wastewater with the fresh water with a single blending valve to obtain a blended water stream, wherein an irrigation controller controls a variable frequency drive (VFD) motor control for the first and second variable speed pumps;
 (d) measuring the electricity conductivity (EC) of the blended water stream with an EC sensor to obtain a measured EC value, wherein the measured EC value is derived at least from the nitrogen content of the blended water stream;
 (e) adjusting the wastewater and fresh water flow rates by the irrigation controller according to the measured EC value; and
 (f) repeating steps (c), (d), and (e), as needed, until the measured EC value in the blended water stream reaches a target EC value.

30. The method of claim 29, further comprising a step of feeding the blended water stream through an irrigation system following step (f).

31. The method of claim 30, wherein the irrigation system is a drip irrigation system.

32. The method of claim 31, wherein the drip irrigation system is a sub-surface irrigation system.

33. The method of claim 31, wherein the drip irrigation system is a surface irrigation system.

34. The method of claim 30, wherein the blended water stream is filtered before being fed through an irrigation system.

35. The method of claim 29, wherein the source of wastewater is a farm storage lagoon.

36. The method of claim 29, wherein the source of fresh water is a well, a surface stream, river, drainage slough, canal, pipeline or a fresh water reservoir.

37. The method of claim 29, wherein the crop is a silage corn crop.

38. The method of claim 29, wherein the steps (c) to (f) are automatically performed in a continuous manner to maintain the measured EC value in the blended water stream at a target EC value.

39. The method of claim 29, wherein the target EC value is calculated according to the projected weekly nitrogen uptake and crop evapotranspiration (ETc).

40. The method of claim 39, wherein, the calculation is based on the formula EC=0.0146÷0.227×uptake (lb Nitrogen/acre)÷ETc (inches)+0.3255.

41. The method of claim 29, wherein the nitrogen in the wastewater is derived from manure.

42. The method of claim 29, wherein the target EC value is greater than zero and less than about 2.5 mmhos/cm.

43. The method of claim 42, wherein the target EC value is greater than about 1 mmhos/cm and less than about 2.25 mmhos/cm.

44. The method of claim 29, wherein the nitrogen content of the blended water stream is greater than zero parts per million (ppm) and less than about 150 ppm.

45. The method of claim 44, wherein the nitrogen content of the blended water stream is greater than about 50 ppm and less than about 125 ppm.

46. An apparatus for blending wastewater with fresh water for fertigation of a crop, comprising:

(a) a single blending valve for blending wastewater with fresh water;
(b) a variable frequency drive (VFD) motor control for independently controlling a first variable speed pump connected to a wastewater source and a second variable speed pump connected to a fresh water source,
(c) an EC sensor for measuring the electricity conductivity (EC) of the blended water stream, wherein the EC of the blended water stream is derived at least from the nitrogen content of the blended water stream; and
(d) an irrigation controller for controlling the VFD motor control to set the wastewater flow rate and fresh water flow rate according to the EC determined for the blended water stream.

47. The apparatus of claim 46, wherein the irrigation controller comprises a motor actuator that actuates the flow ratio of the two or more sources of water.

48. The apparatus of claim 46, wherein said EC sensor is able to continuously monitor the EC level and the irrigation controller controls the blending valve to maintain the predetermined flow ratio automatically and continuously.

49. The apparatus of claim 46, wherein the nitrogen in the wastewater is derived from manure.

50. The apparatus of claim 46, wherein the target EC value is greater than zero and less than about 2.5 mmhos/cm.

51. The apparatus of claim 50, wherein the target EC value is greater than about 1 mmhos/cm and less than about 2.25 mmhos/cm.

52. The apparatus of claim 46, wherein the nitrogen content of the blended water stream is greater than zero parts per million (ppm) and less than about 150 ppm.

53. The apparatus of claim 52, wherein the nitrogen content of the blended water stream is greater than about 50 ppm and less than about 125 ppm.

54. A sub-surface apparatus for blending liquid manure with fresh water for fertigation of a crop, comprising:
(a) a single blending valve for blending liquid manure with fresh water;
(b) single blending valve for blending wastewater with fresh water; a wastewater control valve for adjusting the flow rate of wastewater into a blended water stream, wherein the wastewater is derived from liquid manure;
(c) an EC sensor for measuring the electricity conductivity (EC) of the blended water stream, wherein the measured EC value is derived at least from nitrogen content of the blended water stream; and
(d) an irrigation controller for controlling the wastewater control valve to set the liquid manure flow rate according to the EC determined for the blended water stream.

* * * * *